United States Patent [19]

Kanai

[11] Patent Number: 4,942,469
[45] Date of Patent: Jul. 17, 1990

[54] PICTURE DISPLAY APPARATUS

[75] Inventor: Toshio Kanai, Takatsuki, Japan

[73] Assignee: Matsushita Electric Industrial Co., Ltd., Osaka, Japan

[21] Appl. No.: 299,479

[22] Filed: Jan. 23, 1989

[30] Foreign Application Priority Data

Jan. 28, 1988 [JP] Japan .................................. 63-18027

[51] Int. Cl.$^5$ .............................................. H04N 5/08
[52] U.S. Cl. ...................................... 358/153; 358/158
[58] Field of Search ............... 358/148, 153, 158, 154, 358/155

[56] References Cited

FOREIGN PATENT DOCUMENTS 0010366 1/1986 Japan .................................. 358/153

Primary Examiner—James J. Groody
Assistant Examiner—David E. Harvey
Attorney, Agent, or Firm—Stevens, Davis, Miller & Mosher

[57] ABSTRACT

A picture display apparatus for displaying a picture by using a composite signal including tri-state binary synchronizing signals. A first horizontal synchronizing signal comprising a positive-polarity bilevel (the two-state) signal is generated by detecting a negative-polarity peak portion of an input composite picture signal to accomplish the horizontal synchronization of a picture by use of the first horizontal synchronizing signal whereby when the horizontal synchronization is stabilized, an output pulse produced from the first horizontal synchronizing signal is utilized to extract the tri-state binary horizontal synchronizing signal from the composite picture signal during the time of the output pulse thereby accomplishing horizontal synchronization of the picture by the tri-state binary horizontal synchronizing signal in the stable condition.

2 Claims, 3 Drawing Sheets

FIG.2(c)   OUTPUT OF SYNC SEPARATION CIRCUIT 3

FIG.2(d)   OUTPUT OF PULSE GENERATING CIRCUIT 7

OUTPUT OF DIFFERENTIAL AMPLIFIER CIRCUIT 9

FIG.2(f)   OUTPUT OF FULL-WAVE RECTIFIER CIRCUIT 10

FIG. 4(a) OUTPUT OF CURRENT AMPLIFIER CIRCUIT 11

FIG. 4(b) OUTPUT OF PEAK CLAMP CIRCUIT 12

FIG. 4(c) OUTPUT OF MONOSTABLE MULTIVIBRATOR 13

FIG. 4(d) OUTPUT OF GATE CIRCUIT 14

PICTURE DISPLAY APPARATUS

BACKGROUND OF THE INVENTION

The present invention relates to a picture display apparatus for displaying high quality television pictures or the like.

While, in the conventional television system, the horizontal synchronizing signal comprises a negative-polarity pulse which is inserted on the black level side of a picture signal, studio standards for a high quality television system of Japan specify that the synchronizing signal comprises a combination of two pulses of negative and positive polarities. The horizontal synchronizing signal comprising two pulses of opposite polarities is generally called a tri-state binary synchronizing signal.

The present invention is intended to ensure the positive restoration of this so-called tri-state binary synchronizing signal.

FIG. 3 is a block diagram of a conventional sync separation circuit and FIG. 4 shows a plurality of voltage waveforms at various parts of the conventional sync separation circuit. The conventional technique will now be explained with reference to FIGS. 3 and 4. In FIG. 3, numeral 11 designates a current amplifier circuit for a picture signal including tri-state binary synchronizing signals ((a) of FIG. 4), and 12 a peak clamp circuit for clamping the negative peaks of an output from the current amplifier circuit 11 at a given DC voltage level as shown in (b) of FIG. 4. In the peak clamp circuit 12, current flows during the time of each negative peak in the input so that the peak of an output signal is controlled in accordance with the current value and the peak is maintained at a constant level. Numeral 13 designates a monostable multivibrator which is triggered by the peak clamped output to generate a pulse voltage signal ((c) of FIG. 4), and 14 a gate circuit for utilizing the pulse voltage signal of the monostable multivibrator 13 to extract the output of the peak clamp circuit 12 during the pulse duration time. With this construction, a positive-polarity synchronizing signal is generated at the output of the gate circuit 14 as shown in (d) of FIG. 4.

The conventional technique has two disadvantages. The first disadvantage is that if a large noise is introduced into a composite signal including tri-state binary synchronizing signals and a picture signal, this noise triggers the monostable multivibrator so that the positive-polarity pulse width of a gate output cannot be restored properly. The second disadvantage is that a discrimination circuit having a given threshold value must be newly added to determine the time of rise from the zero potential of the positive-polarity pulse of the tri-state binary synchronizing signal and that the restoration of a perfect tri-state binary synchronizing signal cannot be effected by the above-described construction of the conventional circuit.

SUMMARY OF THE INVENTION

With a view to overcoming the foregoing deficiencies in the prior art, it is an object of the present invention to provide a picture display apparatus capable of ensuring the separation and restoration of a perfect tri-state binary synchronizing signal from a picture signal.

Thus, the picture display apparatus according to the invention includes, as means for overcoming the deficiencies in the prior art, a first sync separation circuit for producing a first horizontal synchronizing signal of positive polarity with clipping the peak of an input composite signal, a pulse generating circuit for producing a pulse synchronized with an output of a horizontal oscillator circuit which oscillates in synchronism with a horizontal synchronizing signal, and a second sync separation circuit for a signal from the input composite signal during the time of the output pulse from the pulse generating circuit so as to produce a second horizontal synchronizing signal, whereby the output synchronizing signals of the first and second sync separation circuits are selectively generated as a horizontal synchronizing circuit.

With this construction, during the time that the horizontal oscillator circuit is out of synchronism the bilevel (the two-state) first horizontal synchronizing signal is used to accomplish synchronization, whereas once the synchronization has been produced the second horizontal synchronizing signal or tri-state binary synchronizing signal is used to accomplish an accurate synchronization. As a result, a very excellent picture display apparatus is provided which is capable of reducing the effect of noise introduced into the synchronizing signal and accurately restoring the tri-state binary synchronizing signal.

BRIEF DESCRIPTION OF THE DRAWINGS

FIG. 2(a)–(f) shows a plurality of voltage waveforms useful for explaining the operation of the picture display apparatus according to the embodiment of the invention.

FIG. 4(a)–(d) shows a plurality of voltage waveforms useful for explaining the operation of the conventional sync separation circuit.

DESCRIPTION OF THE PREFERRED EMBODIMENT

Figure 1:
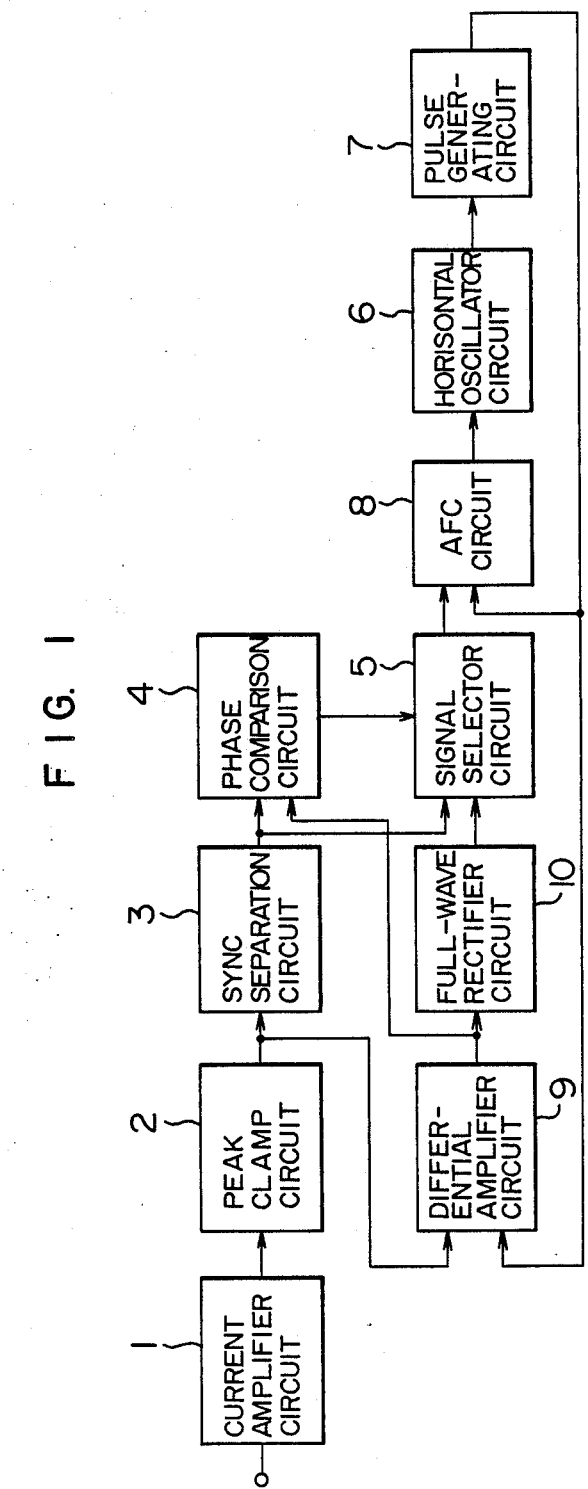
FIG. 1 is a block diagram of a picture display apparatus according to an embodiment of the invention.
Figure 2A:
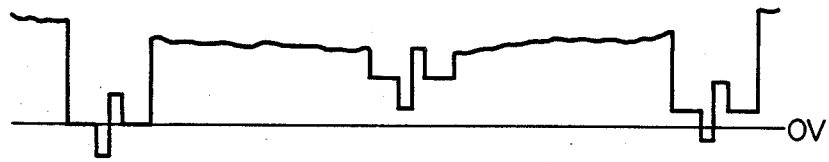
Figure 2B:
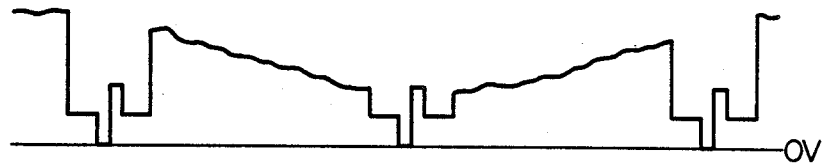
Figure 2B:
Figure 2B:
Figure 2E:
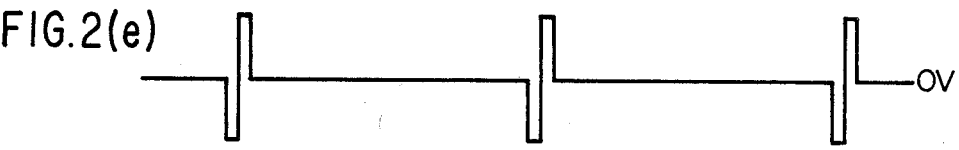
Figure 2E:
Figure 3:
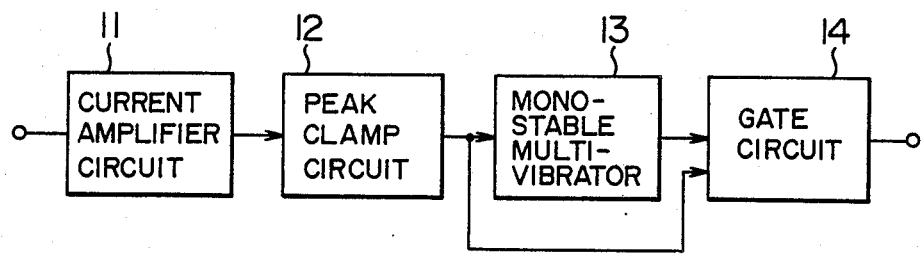
FIG. 3 is a block diagram of a conventional sync separation circuit.
Figure 3:
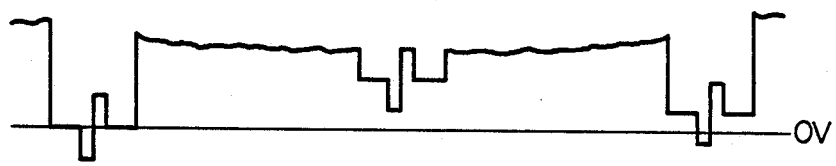
Figure 3:
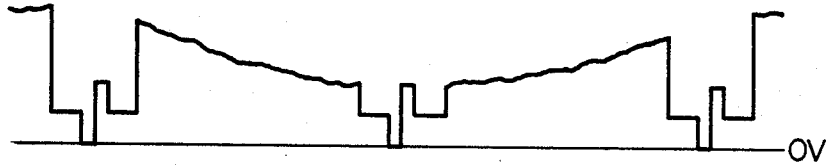
Figure 3:
Figure 3:

A picture display apparatus according to an embodiment of the present invention will now be described with reference to the drawings. FIG. 1 is a block diagram of a display apparatus according to the embodiment of the invention, and FIG. 2 shows a plurality of voltage waveforms useful for explaining the operation of the picture display apparatus shown in FIG. 1.

In FIG. 1, numeral 1 designates a current amplifier circuit for amplifying a picture signal including a tri-state binary synchronizing signal, 2 a peak clamp circuit for clamping the negative peak of an output from the current amplifier circuit 1 at a constant voltage level, 3 a sync separation circuit for clipping the negative pulse portion of an output from the peak clamp circuit 2 at a given threshold value to produce a positive-polarity bilevel (the two-state) horizontal synchronizing signal (hereinafter referred to as a first horizontal synchronizing signal), 4 a phase comparison circuit for receiving and comparing in phase the first horizontal synchronizing signal and a tri-state binary second synchronizing signal which will be described later whereby when the first and second horizontal synchronizing signals are in phase a control signal is generated so that the second horizontal synchronizing signal is selected as an output horizontal synchronizing signal, 5 a signal selector circuit for receiving the first and second horizontal synchronizing signals to output one or the other of the horizontal synchronizing signals in response to an output control signal of the phase comparison circuit 4, 6 a horizontal oscillator circuit for receiving the horizontal synchronizing signal to oscillate, and 7 a pulse generating circuit for producing an output pulse of a pulse width corresponding to the horizontal blanking period in accordance with an output oscillation signal from the horizontal oscillator circuit 6. Inserted between the signal selector circuit 5 and the horizontal oscillator circuit 6 is an AFC circuit (auto-frequency control circuit) 8 for comparing the output horizontal synchronizing signal of the signal selector circuit 5 and the output pulse of the pulse generating circuit 7 in phase whereby in accordance with the result of the comparison a signal is generated to control the oscillation frequency of the horizontal oscillator circuit 6 so that the two signals are in phase. Numeral 9 designates a differential amplifier circuit for receiving the output pulse of the pulse generating circuit 7 and the composite signal subjected to negative peak clamping by the peak clamp circuit 2 to extract a signal from the composite signal during the time of the output pulse to generate a tri-state binary horizontal synchronizing signal or a second horizontal synchronizing signal, and 10 a full-wave rectifier circuit for full-wave rectifying the output of the differential amplifier circuit 9.

As described above, the differential amplifier circuit 9 is the one to which are applied the outputs of the peak clamp circuit 2 and the pulse generating circuit 7. The outputs of the peak clamp circuit 2 and the pulse generating circuit 7 are respectively shown in (b) and (d) of FIG. 2, and the differential amplifier circuit 9 functions so that outputs respectively proportional to the sum and difference between the outputs of the peak clamp circuit 2 and the pulse generating circuit 7 are first produced and a computation is performed on the basis of the sum and difference signals to remove the picture signal component, thereby producing the synchronizing signal shown in (e) of FIG. 2. It is arranged so that this output is not generated except during the time of the output pulse from the pulse generating circuit 7 thereby preventing the picture signal from being introduced into the output. Since the noise introduced into the picture signal does not appear at the output of the differential amplifier circuit 9, the noise in its output is reduced extremely as compared with the output of the sync separation circuit 3 and the horizontal oscillator circuit 6 is made stable.

The full-wave rectifier circuit 10 is a matrix-connection diode rectifier circuit for full-wave rectifying its input and it produces the voltage shown in (f) of FIG. 2 in response to the application of the voltage shown in (e) of FIG. 2. It is to be noted that its output pulse has two peaks under the effect of the forward voltages of the diodes and this voltage causes no difficulty in the operation of the ordinarily used sawtooth AFC circuit 8. The phase comparison circuit 4 can be easily realized by forming it with two monostable multivibrators and a voltage comparator circuit connected to the outputs of the former. The first and second horizontal synchronizing signals are applied to the inputs of the monostable multivibrators to trigger them to generate a pulse voltage. A comparison of the outputs of the monostable multivibrators triggered by the two signals shows that the outputs are shifted in time in accordance with the time difference between the inputs. In order to avoid the effect of noise, it is preferable to apply the inputs passed through low-pass filters. At this time, the two signals undergo the same phase distortion and therefore no difficulty is caused in the phase comparison. When there is a difference in voltage between the two signals, the voltage comparator circuit generates a voltage and this voltage is integrated to produce a DC voltage when the phases of the two signals are not in step. This DC voltage is used as a control signal which is applied to the control side of the signal selector circuit 5.

With the construction described above, the operation of the picture display apparatus according to the embodiment will now be described.

The composite signal (in (a) of FIG. 2) applied to the current amplifier circuit 1 is amplified by the current amplifier circuit 1 and applied to the peak clamp circuit 2 where the peak of the negative-polarity pulse of the resulting tri-state binary synchronizing signal is clamped at a constant level as shown in (b) of FIG. 2. The composite signal thus having the negative peak clamped at the constant level is applied to the sync separation circuit 3 so that when there is the signal component lower than a given level, the positive polarity (bilevel) pulse voltage shown in (c) of FIG. 2 or a first horizontal synchronizing signal is formed and generated. This first horizontal synchronizing signal is applied to the horizontal oscillator circuit 6 through the signal selector circuit 5 and the AFC circuit 8 and the horizontal oscillator circuit 6 oscillates in response to the horizontal synchronizing signal. The horizontal oscillator circuit 6 applies its oscillation output to the pulse generating circuit 7 which in turn generates a positive-polarity pulse of a pulse width corresponding to the horizontal blanking period as shown in (d) of FIG. 2.

The composite signal (in (b) of FIG. 2) having the negative peak clamped by the peak clamp circuit 2 is also applied to the differential amplifier circuit 9. The output pulse (in (d) of FIG. 2) of the pulse generating circuit 7 is supplied to the differential amplifier circuit 9 so that in accordance with the two inputs, the tri-state binary horizontal synchronizing signal (the second horizontal synchronizing signal) shown in (e) of FIG. 2 is extracted from the composite signal. The second horizontal synchronizing signal (in (e) of FIG. 2) is rectified by the full-wave rectifier circuit 10 so that it is converted to a positive-polarity pulse as shown in (f) of FIG. 2 and applied to the horizontal oscillator circuit 6 through the signal selector circuit 5 and the AFC circuit 8 as in the case of the first horizontal synchronizing signal, thereby causing the pulse generating circuit 7 to generate the output pulse shown in (d) of FIG. 2.

Then, with the composite signal being applied, when the picture display apparatus is connected to a power source, the horizontal oscillator circuit 6 starts its free oscillation and this oscillation is not in synchronism with the input composite signal, thus allowing the introduction of the composite signal into the second horizontal synchronizing signal produced from the differential amplifier circuit 9. In addition, the second horizontal synchronizing signal is not in phase with the first horizontal synchronizing signal generated from the sync separation circuit 3. Therefore, the phase comparison circuit 4 applies a control signal to the signal selector circuit 5 so as to select the first horizontal synchronizing signal, so that the first horizontal synchronizing signal is applied to the AFC circuit 8 and the horizontal oscillator circuit 6 is synchronized with the input signal.

If the second horizontal synchronizing signal is applied to the AFC circuit 8, the resulting AFC output will become random, thus giving rise to an extremely inconvenient condition.

Then, in accordance with the high definition television system which has been proposed in Japan, the transition point from the negative voltage to the positive voltage of a tri-state binary horizontal synchronizing signal is selected as a reference for synchronization. Therefore, the first horizontal synchronizing signal cannot be said as the proper synchronizing signal since it includes no positive-polarity pulse. Thus, if synchronization is accomplished by the first horizontal synchronizing signal, the picture is shifted horizontally on the screen. However, the displayed picture of the apparatus is stabilized by use of the first horizontal synchronizing signal. When the picture is stabilized in this way, the phase of the second horizontal synchronizing signal extracted and formed by the output pulse of the pulse generating circuit 7 is held in step with the phase of the first horizontal synchronizing signal. As a result, the phase comparison circuit 4 applies a control signal to the signal selector circuit 5 so as to select the second horizontal synchronizing signal as a horizontal synchronizing signal and synchronization is accomplished by the second horizontal synchronizing signal (tri-state binary horizontal synchronizing signal). The apparatus is accurately synchronized and the picture is accurately displayed centrally on the screen.

The apparatus of this invention can also be applied to the ordinary television receivers and it is possible to prevent the noise introduced into the picture signal from being introduced into the synchronizing signal thereby disturbing the synchronization.

From the foregoing description it will be seen that in accordance with the present invention there is provided a picture display apparatus which is very excellent in that the occurrence of any synchronization irregularity is prevented by the provision of a circuit for extracting a synchronizing signal by means of a pulse derived from a horizontal oscillator circuit and a circuit for determining that two signals are in phase so as to selectively use these signals.

What is claimed is:

1. A picture display apparatus comprising:
   an AFC circuit receiving a first synchronizing signal, a horizontal oscillator circuit having its oscillation frequency controlled by the output signal of said AFC circuit, a pulse generating circuit synchronized by the output signal of said horizontal oscillator circuit, a sync separation circuit producing a second synchronizing signal by clipping an input composite signal, a differential amplifier circuit operating on said composite signal with a pulse signal produced by said pulse generating circuit to extract a third synchronizing signal from said composite signal during the time of existence of said pulse signal, a phase comparison circuit for comparing the phase of said second and third synchronizing signals, and a selector circuit for selecting as said first synchronizing signal one of said second and third synchronizing signals according to the output of said phase comparison circuit, said horizontal oscillator circuit being synchronized by an output of said AFC circuit so that said differential amplifier circuit is able to extract said third synchronizing signal from said composite signal during the time of occurrence of a pulse produced by said pulse generating circuit, and said selector circuit selecting said third synchronizing signal as said first synchronizing signal when said second and third synchronizing signals applied to said phase comparison circuit are in phase.

2. A picture display apparatus comprising:
   a peak clamp circuit for clamping one of negative and positive peak of an input composite picture signal, a first sync separation circuit for generating a first horizontal synchronizing pulse signal when said composite picture signal clamped by said peak clamp circuit has a signal level which exceeds a predetermined level, a pulse generating circuit for receiving a horizontal synchronizing signal to generate a pulse signal of a given pulse width, a second sync separation circuit for receiving said clamped composite picture signal and the output pulse signal from said pulse generating circuit to extract a second horizontal synchronizing pulse signal from said clamped composite picture signal during the time of occurrence of a pulse in said output pulse signal, and a signal selector circuit for outputting said second horizontal synchornizing signal when said first and second horizontal synchronizing pulse signals are in phase.

* * * * *